(12) United States Patent
Ko et al.

(10) Patent No.: US 12,224,459 B2
(45) Date of Patent: Feb. 11, 2025

(54) BUTTON CELL

(71) Applicant: SAMSUNG SDI CO., LTD., Yongin-si (KR)

(72) Inventors: Heejung Ko, Yongin-si (KR); Kijung Kim, Yongin-si (KR); Yongjin Park, Yongin-si (KR); Byongchul Woo, Yongin-si (KR); Jong-Ha Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/202,881

(22) Filed: Mar. 16, 2021

(65) Prior Publication Data

US 2021/0399392 A1  Dec. 23, 2021

(30) Foreign Application Priority Data

Jun. 17, 2020  (KR) .................. 10-2020-0073855

(51) Int. Cl.
*H01M 50/547* (2021.01)
*H01M 50/109* (2021.01)
*H01M 50/153* (2021.01)
*H01M 50/181* (2021.01)
*H01M 50/533* (2021.01)
(Continued)

(52) U.S. Cl.
CPC ....... *H01M 50/547* (2021.01); *H01M 50/109* (2021.01); *H01M 50/153* (2021.01); *H01M 50/181* (2021.01); *H01M 50/533* (2021.01); *H01M 50/559* (2021.01); *H01M 50/566* (2021.01)

(58) Field of Classification Search
CPC ............. H01M 50/547; H01M 50/181; H01M 50/109; H01M 50/559; H01M 50/533; H01M 50/153; H01M 50/566
USPC ........................................................ 429/179
See application file for complete search history.

(56) References Cited

U.S. PATENT DOCUMENTS

| | | | | |
|---|---|---|---|---|
| 2,332,456 A | * | 10/1943 | McEachron | H01M 50/182 429/169 |
| 7,341,802 B1 | * | 3/2008 | Ota | H01M 50/191 429/181 |

(Continued)

FOREIGN PATENT DOCUMENTS

| | | |
|---|---|---|
| EP | 2 416 406 B1 | 7/2019 |
| KR | 10-2018-0113857 A | 10/2018 |

(Continued)

OTHER PUBLICATIONS

Kim (translation) (Year: 2018).*

(Continued)

*Primary Examiner* — Matthew T Martin
*Assistant Examiner* — Paul Christian St Wyrough
(74) *Attorney, Agent, or Firm* — Lewis Roca Rothgerber Christie LLP (57) ABSTRACT

A rechargeable battery includes: a case receiving an electrode assembly and including an opening; a cap assembly including a cap plate coupled to the case and covering the opening, and a terminal plate coupled to the cap plate; and a housing covering the cap plate and coupled to the case, and an outer surface of the terminal plate protrudes more than an outer surface of the housing to have a height difference.

13 Claims, 6 Drawing Sheets

(51) Int. Cl.
    *H01M 50/559*    (2021.01)
    *H01M 50/566*    (2021.01)

(56) References Cited

U.S. PATENT DOCUMENTS

| | | |
|---|---|---|
| 2016/0104914 A1 | 4/2016 | Lee et al. |
| 2017/0207491 A1* | 7/2017 | Tamachi ........... H01M 10/0587 |
| | | 118/100 |
| 2020/0006742 A1 | 1/2020 | Kim |

FOREIGN PATENT DOCUMENTS

| | | | |
|---|---|---|---|
| KR | 10-2020-0007559 A | 1/2020 | |
| KR | 10-2020-0020173 A | 2/2020 | |
| WO | WO-2018164389 A1 * | 9/2018 | .......... H01M 10/052 |

OTHER PUBLICATIONS

Extended European Search Report issued in corresponding European Application No. 21171193.2, dated Oct. 14, 2021, 9 pages.
European Office Action dated Nov. 30, 2022 issued in corresponding European Application No. 21171193.2 (4 pages).
Chinese Office Action dated Jan. 29, 2024, issued in corresponding Chinese Patent Application No. 202110424094.5 (12 pages, including 6 pages of English translation).

* cited by examiner

BUTTON CELL

CROSS-REFERENCE TO RELATED APPLICATION

This application claims priority to and the benefit of Korean Patent Application No. 10-2020-0073855, filed on Jun. 17, 2020 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery can be repeatedly charged and discharged, unlike a primary battery that cannot be recharged. A low-capacity rechargeable battery is used for portable small-sized electronic devices, such as mobile phones, notebook computers, and camcorders. A large-capacity battery is widely used as a power source for driving motors, such as for hybrid vehicles.

A representative rechargeable battery includes a nickel-cadmium (Ni—Cd) battery, a nickel-hydrogen (Ni-MH) battery, a lithium (Li) battery, and a lithium ion (Li-ion) rechargeable battery. Particularly, the lithium ion secondary battery has a higher operation voltage than the nickel-cadmium battery or the nickel-hydrogen battery that is mainly used as a portable electric equipment power source by about three times. Also, the lithium ion secondary battery is widely used in that energy density per unit weight is high.

In particular, as a demand for wearable devices, such as headphones, earphones, smartwatches, and body-mounted medical devices which use Bluetooth, has increased, the need for rechargeable batteries of which energy density is high and which are ultra-small is increasing.

The ultra-small rechargeable battery has aspects of securing required electrical capacity within a limited size, implementing an efficient structure while improving an effective low weight, and improving structural stability.

The above information disclosed in this Background section is only for enhancement of understanding of the background of the invention, and, therefore, it may contain information that does not form the prior art that is already known in this country to a person of ordinary skill in the art.

SUMMARY

According to an aspect of embodiments of the present invention, an ultra-small rechargeable battery is provided. According to an aspect of embodiments of the present invention, a rechargeable battery that may prevent a reverse direction insertion when inserting to a set and may prevent an external short circuit of parts with different polarities (e.g., a terminal plate and a cap plate or a case) is provided.

According to another aspect of embodiments of the present invention, a rechargeable battery is provided in which a terminal plate and a case having different polarities may be smoothly contacted with a set when being inserted into the set.

According to one or more embodiments of the present invention, a rechargeable battery includes: a case receiving an electrode assembly and including an opening; a cap assembly including a cap plate coupled to the case and covering the opening, and a terminal plate coupled to the cap plate; and a housing covering the cap plate and coupled to the case, wherein an outer surface of the terminal plate protrudes more than an outer surface of the housing to have a height difference.

The electrode assembly may include a first electrode, a second electrode, and a separator therebetween, the case may be connected to the first electrode by a first electrode tab, and the terminal plate may be connected to the second electrode by a second electrode tab.

The cap plate may be electrically connected to the case, and the cap plate and the terminal plate may be thermally fused with a thermal-fusion member located therebetween and may be electrically insulated from each other.

The terminal plate may include: a flange part disposed between the cap plate and the electrode assembly and electrically insulated from and attached to an inner surface of the cap plate; and a protruded terminal protruded from a center of the flange part to the outside, penetrating a terminal hole of the cap plate and a through hole of the housing, and electrically connected to the second electrode tab by an inner surface of the terminal plate, and the protruded terminal may protrude more than the outer surface of the housing by a first height difference to form an outer surface of the rechargeable battery.

The housing may include: a planar part that covers an outer surface of the cap plate; and a side part extending along a side of the case at an outside of the planar part to cover a part of the side of the case and to be coupled to the side of the case.

The housing may be formed of an electrically insulating material to prevent an electrical short circuit between the outer surface of the protruded terminal and the outer surface of the cap plate.

The through hole of the housing may be concentric with the terminal hole of the cap plate, and an interior diameter of the through hole may be larger than an exterior diameter of the protruded terminal.

An interior diameter of the case may be larger than a sum of the exterior diameter of the protruded terminal and two times a diameter direction distance of the planar part set on both sides in a diameter direction of the protruded terminal.

The housing may include PP, PE, PET, PEN resin, or rubber.

The terminal plate may include: a flange part on an outer surface of the cap plate and electrically insulated and attached to the outer surface of the cap plate; and a tab connection part that is protruded from the center of the flange part to the inside and that is protruded toward the electrode assembly through a through hole of the housing and a terminal hole of the cap plate, and is electrically connected to the second electrode tab by an inner surface of the terminal plate, and the flange part may protrude more than the outer surface of the housing by a second height difference to form an outer surface of the rechargeable battery.

The housing may include: a planar part including a through hole having a larger interior diameter than an exterior diameter of the flange part to cover an exposed surface of the cap plate while exposing the flange part; and a side part extending along a side of the case at an outside of the planar part to cover a part of the side of the case and to be joined to the side of the case.

An interior diameter of the case may be larger than a sum of the exterior diameter of the flange part and two times a diameter direction distance of the planar part set on both sides in a diameter direction of the flange part.

The housing may form a step on a side of the case.

The case may set a first diameter in a diameter direction at a lower part of the case, and the housing may be coupled to an upper part of the case and set a second diameter larger than the first diameter in the diameter direction.

As set forth above, the rechargeable battery according to one or more embodiments of the present invention forms a step on the side of the case because the housing covers the cap plate and is coupled to the case. In other words, since the housing protrudes more than the side of the case at the cap plate and its adjacent side, the step in which the height or diameter is increased may be formed. Therefore, visually or structurally, a reverse direction insertion of the rechargeable battery into a set may be effectively prevented.

In the rechargeable battery according to one or more embodiments, two parts (e.g., the cap plate and the terminal plate) with different polarities in the cap assembly are exposed in the same direction, and the housing may cover at least one of two parts with different polarities. When the housing is formed of an electrically insulating material, an external short circuit of two parts by a conductive particle may be effectively prevented.

Further, since the rechargeable battery according to one or more embodiments combines the housing to the case, the housing acts as a buffer against a physical impact, such that safety may be improved in a drop test and a tumbling test.

In the rechargeable battery according to one or more embodiments, the terminal plate is protruded more than the housing despite the application of the housing, such that the terminal plate and the case may be in smooth contact with a set when being inserted into the set.

DESCRIPTION OF REFERENCE SYMBOLS

| | |
|---|---|
| 1, 2: rechargeable battery | 10: electrode assembly |
| 11: first electrode | 12: second electrode |
| 13: separator | 14: insulating sheet |
| 20: case | 21: opening |
| 30, 60: cap assembly | 31: cap plate |
| 33, 63: terminal plate | 34: thermal-fusion member |
| 40, 70: housing | 41, 71: planar part |
| 42, 72: side part | 51: first electrode tab |
| 52: second electrode tab | 61, 62: insulating member |
| 611, 621: through hole | 101: first end |
| 102: second end | 301: exposed surface |
| 311: terminal hole | 331, 631: flange part |
| 332, 632: protruded terminal | 341: through hole |
| 411, 711: through hole | D: battery diameter |
| D1, D2: interior diameter | D11, D21: exterior diameter |
| D12, D22: diameter direction distance | H: height |

-continued

| | |
|---|---|
| H1, H2: length of height direction | G1, G2: first, second gap |
| P1, P3: extension part | P2, P4: non-extension part |
| ΔH1, ΔH2: first, second height difference | |

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, unless explicitly described to the contrary, it is to be understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

Also, in this specification, it is to be understood that when one component is referred to as being "connected" or "coupled" to another component, it may be connected or coupled directly to the other component or connected or coupled to another component with one or more other components intervening therebetween.

Singular forms are to include plural forms unless the context clearly indicates otherwise.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

A rechargeable battery according to an embodiment of the present invention, which is an ultra-compact battery, may be a coin cell or a button cell. Here, the coin cell or the button cell is a thin coin-type or button-type cell, and refers to a battery having a ratio (H/D) of a height (H) to a diameter (D) of 1 or less (see FIG. 1).

In an embodiment, the coin cell or the button cell is mainly cylindrical, and a horizontal cross-section is circular, but the present invention is not limited thereto, and a horizontal cross-section may be oval or polygonal. In this case, a diameter is determined as a maximum distance of a housing (or a case) exterior circumference based on the horizontal direction of the battery, and a height is determined as a maximum distance (a distance from a flat bottom to a flat top cross-section) based on the vertical direction of the battery.

However, the present invention is not limited to the coin cell or the button cell that is an example of the present invention, and a battery of the present invention may be a cylindrical-type or pin-type battery. Herein, a case in which a rechargeable battery according to an embodiment of the present invention is a coin cell or a button cell will be described as an example in further detail.

Figure 1:
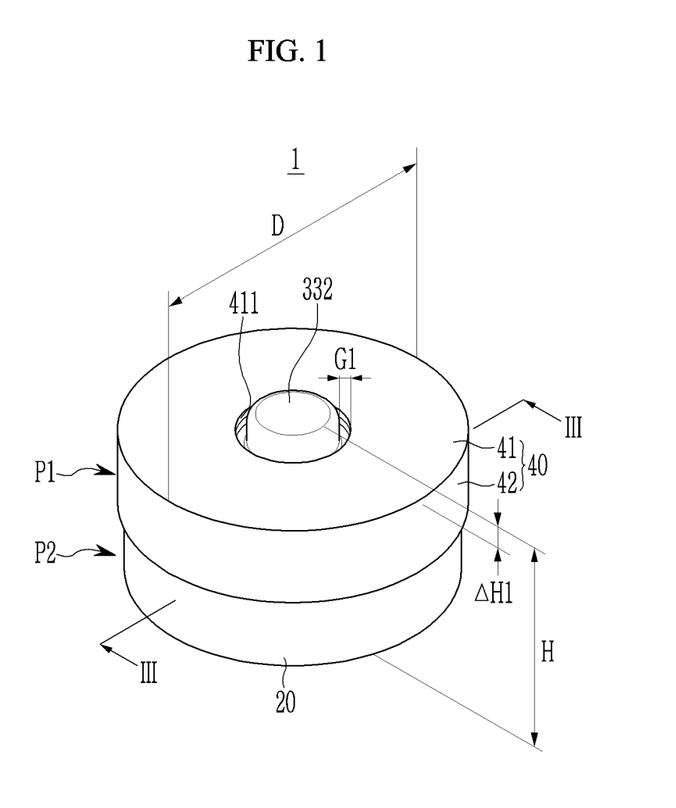
FIG. 1 is a perspective view of a rechargeable battery according to an embodiment of the present invention.
Figure 2:
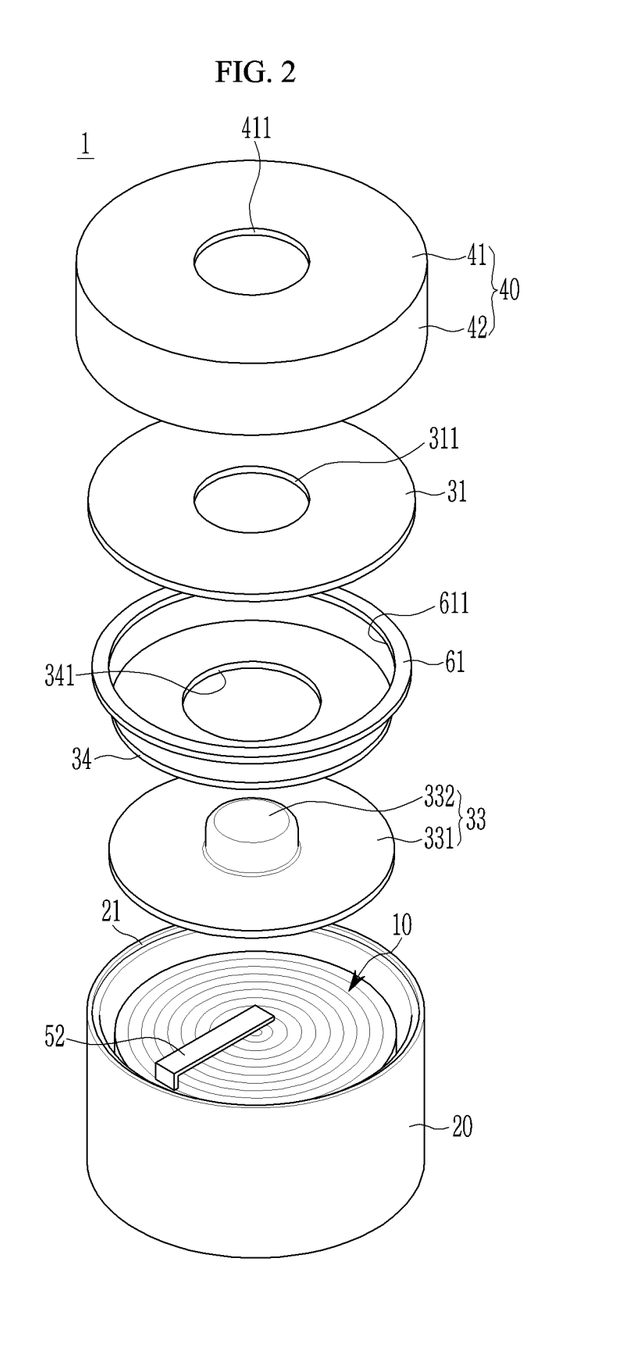
FIG. 2 is an exploded perspective view of the rechargeable battery of FIG. 1.

FIG. 1 is a perspective view of a rechargeable battery according to an embodiment of the present invention; FIG. 2 is an exploded perspective view of the rechargeable battery of FIG. 1; and FIG. 3 is a cross-sectional view taken along the line III-III of FIG. 1.

Figure 3:
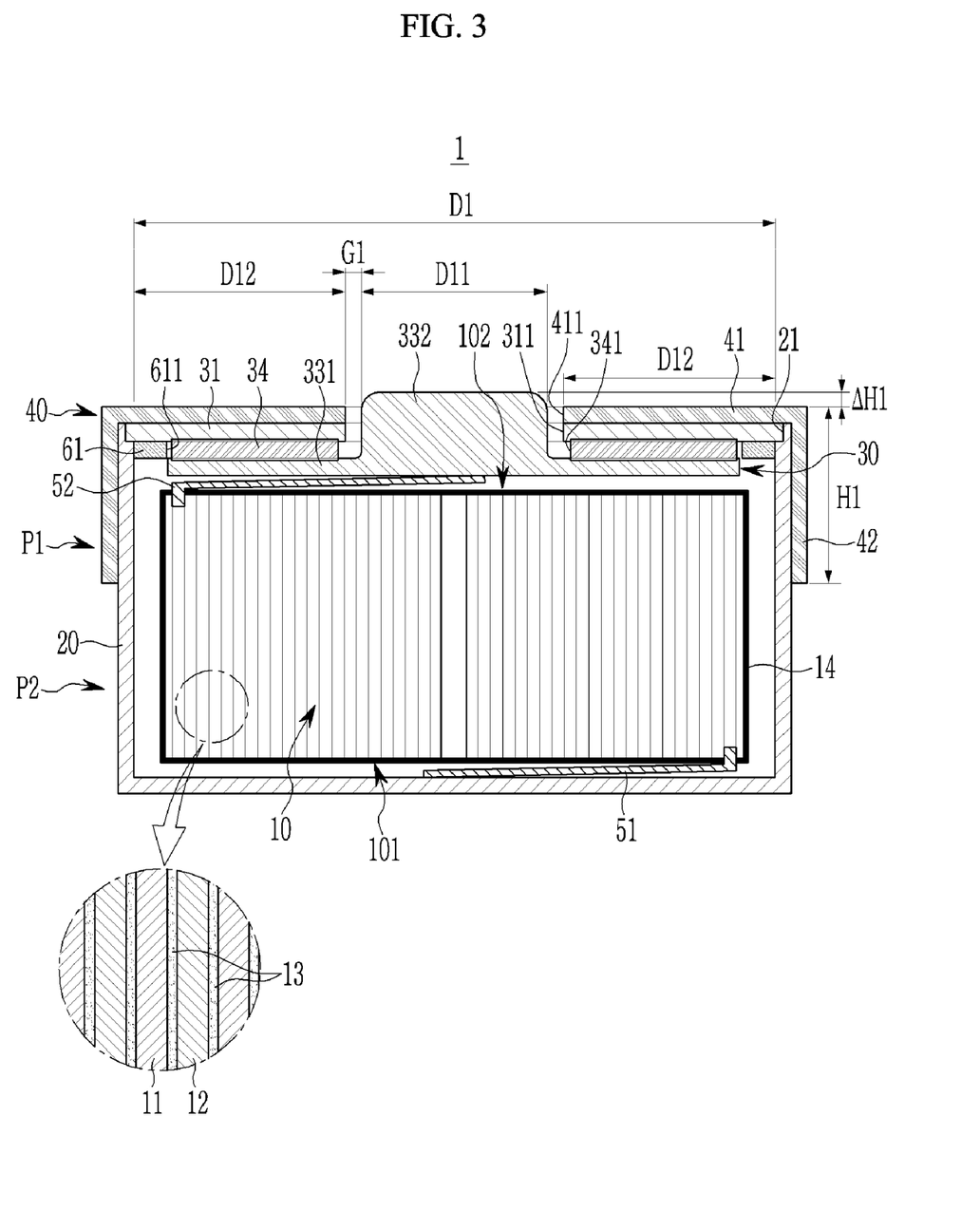
FIG. 3 is a cross-sectional view taken along the line III-Ill of FIG. 1.

Referring to FIG. 1 to FIG. 3, a rechargeable battery 1 according to an embodiment includes an electrode assembly 10, a case 20, a cap assembly 30, and a housing 40. The cap assembly 30 includes a cap plate 31 and a terminal plate 33 that are combined together. As an example, the cap plate 31 and the terminal plate 33 are thermally fused by a thermal-fusion member 34 disposed between them.

The thermal-fusion member 34 acts as a medium to connect the cap plate 31 and the terminal plate 33 to each other. For example, the thermal fusion member 34 may be formed of an electrically insulating material, such as a polymer, and may be melted using a laser or the like to be fused to the cap plate 31 and the terminal plate 33.

In an embodiment, by coupling the terminal plate 33 to the cap plate 31 with the thermal fusion member 34, it is possible to form a stable coupling structure while effectively insulating between the terminal plate 33 and the cap plate 31 without adding a separate insulating configuration.

Since a coin cell is manufactured in an ultra-compact size, it may have a design limitation in terms of space, and, accordingly, functionality is secured while simplifying a structure and a manufacturing process thereof. Regarding this, in the embodiment, insulation and coupling between the terminal plate 33 and the cap plate 31 through the heat-fusion member 34 are realized.

The electrode assembly 10 includes a first electrode 11 (for example, a negative electrode) and a second electrode 12 (for example, a positive electrode) provided at respective sides of a separator 13 that is an electrically insulating material, and is formed by winding the first electrode 11, the separator 13, and the second electrode 12. Therefore, in an embodiment, the electrode assembly 10 may be formed as a jelly roll type. Although not shown separately, in an embodiment, the electrode assembly may be formed as a stack type.

The electrode assembly 10 is configured to charge and discharge a current, and a winding axis in the electrode assembly 10 may be arranged parallel to a height direction (a vertical direction in FIG. 1 to FIG. 3) of the case 20. In an embodiment, a first end (a lower surface of the electrode assembly) 101 and a second end (an upper surface of the electrode assembly) 102 of the electrode assembly 10 may be flat and parallel to each other. In an embodiment, the electrode assembly 10 is not provided with a center pin, but a center pin (not shown) may be provided at a position of the winding axis.

The case 20 accommodates the electrode assembly 10 while facing the first end 101 of the electrode assembly 10.

In an embodiment, the electrode assembly 10 is covered with an insulating sheet 14 and is embedded in the case 20. As an example, the case 20 is formed as a cylinder that accommodates the jelly roll type of electrode assembly 10, and the cap assembly 30 seals an opening 21 of the cylindrical case 20.

In an embodiment, the electrode assembly 10 includes a first electrode tab 51 connected to the first electrode 11 and a second electrode tab 52 connected to the second electrode 12, and the first and second electrodes 11 and 12 are drawn out to the first and second ends 101 and 102, respectively.

In a state in which the electrode assembly 10 is accommodated in the case 20, the first electrode tab 51 is electrically connected to a bottom of the case 20, and the second electrode tab 52 is electrically connected to the terminal plate 33 of the cap assembly 30.

In addition, the cap plate 31 of the cap assembly 30, while facing the second end 102 of the electrode assembly 10, is coupled to the case 20 to cover the opening 21. In this way, the terminal plate 33 is coupled to the second electrode tab 52 while being coupled to the cap plate 31 with the thermal-fusion member 34.

Herein, a case in which the first electrode 11 and the second electrode 12 are respectively a negative electrode and a positive electrode will be described as an example, but the present invention is not limited thereto, and the first electrode 11 and the second electrode 12 may respectively be a positive electrode and a negative electrode.

In an embodiment, the first electrode (negative electrode) 11 is formed in a long extending strip shape, and includes a negative coated portion that is a region in which a negative active material layer is coated to a current collector of a metal foil (for example, a Cu foil) and a negative uncoated portion that is a region in which an active material is not coated. The negative uncoated portion may be disposed at an end portion in a length direction of the negative electrode.

In an embodiment, the second electrode (the positive electrode) 12 is formed in a long extending strip shape, and includes a positive electrode coated portion that is a region in which a positive active material layer is coated to a current collector of a metal foil (for example, an Al foil) and a positive uncoated portion that is a region in which an active material is not coated. The positive uncoated portion may be disposed at an end portion in a length direction of the positive electrode.

The case 20 allows the electrode assembly 10 to be inserted into the opening 21 formed at one side thereof, and has a space for accommodating the electrode assembly 10 and an electrolyte therein. For example, the case 20 may be formed in a cylindrical shape having a height H less than a diameter D thereof, and may have a circular opening 21 such that the cylindrical electrode assembly 10 corresponding to an inner space thereof may be inserted.

In the cap assembly 30, the terminal plate 33 includes a flange part 331 and a protruded terminal 332. The flange part 331 is disposed between the cap plate 31 and the electrode assembly 10 to be electrically insulated from and attached to the inner surface of the cap plate 31.

The housing 40 is provided to prevent or substantially prevent a reverse direction insertion when assembling the rechargeable battery 1 into a set. As an example, the housing 40 covers the cap plate 31 and is bonded to the case 20 to form an extension part P1 in the rechargeable battery 1. That is, the housing 40 forms a step on the side of the case 20 by the extension part P1.

Therefore, the housing 40 defines both sides of the height direction (the up-down direction) of the rechargeable battery 1 as an extension part P1 on the upper side and a non-extension part P2 on the lower side. That is, in the rechargeable battery 1, the portion where the housing 40 is coupled forms the extension part P1, and the portion without the housing 40 forms the non-extension part P2.

In the non-extension part P2, the case 20 has a negative property of the first electrode 11, and, in the extension part P1, the terminal plate 33 has a positive property of the second electrode 12. In an embodiment, the cap plate 31 coupled to the case 20 has the negative property of the first electrode 11 together with the case 20. That is, the cap plate 31 and the case 20 are electrically connected to each other.

In the terminal plate 33, the protruded terminal 332 is protruded from the center of the flange part 331 to the outside and penetrates a terminal hole 311 of the cap plate 31, a through hole 341 of the thermal-fusion member 34, and a through hole 411 of the housing 40, and an inner surface of the protruded terminal 332 is electrically connected to the second electrode tab 52. The second electrode tab 52 may be connected to an inner surface of the flange part 331 or the inner surface of the protruded terminal 332, or may be connected to both.

The protruded terminal 332 is protruded more with a first height difference ΔH1 than an outer surface of the housing 40 to form an outer surface. That is, the outer surface of the protruded terminal 332 is more protruded than an outer surface of the cap plate 31 with reference to a bottom of the case 20. Further, the outer surface of the protruded terminal 332 and the outer surface of the housing 40 form planes spaced apart from each other in the diameter direction while having the first height difference ΔH1.

In an embodiment, the housing 40 includes a planar part 41 and a side part 42. The planar part 41 is configured to cover the outer surface of the cap plate 31 while exposing the protruded terminal 332 through the through hole 411. The side part 42 extends along the side of the case 20 on the outer side of the planar part 41 to accommodate a part of the case 20 side and to be coupled to the side of the case 20. In the rechargeable battery 1, the part where the housing 40 is combined forms the extension part P1, and the part without the housing 40 forms the non-extension part P2.

Therefore, the housing 40 forms a step on the side of the case 20 at a boundary between the extension part P1 and the non-extension part P2 in the height direction and a crossing direction (the diameter direction) orthogonal to the height direction. That is, the extension part P1 relatively increases the height or the diameter compared to the non-extension part P2.

In the case 20, the housing 40 is not combined at the lower part, thereby setting the exterior diameter of the case 20 between the exterior sides in the diameter direction of the case 20. The housing 40 is coupled to the upper part of the case 20 to set the exterior diameter of the housing 40 between the exterior sides in the diameter direction of the housing 40. The exterior diameter of the housing 40 is larger than the exterior diameter of the case 20. Therefore, there is a difference in diameter between the upper part and the lower part of the rechargeable battery 1.

In an embodiment, the housing 40 may be formed of an electrically insulating material to prevent or substantially prevent an electrical short circuit between the outer surface of the protruded terminal 332 and the outer surface of the cap plate 31. For example, the housing 40 may be formed of polypropylene (PP), polyethylene (PE), polyethylene terephthalate (PET), polyethylene naphthalate (PEN) resin, or rubber. Although not illustrated, any of synthetic resins or electrically insulating materials may be applied to the housing.

In an embodiment, the through hole 411 of the housing 40 is concentric with the terminal hole 311 of the cap plate 31, and an interior diameter of the through hole 411 is formed larger than an exterior diameter D11 of the protruded terminal 332. Therefore, the interior diameter D1 of the case 20 is larger than the sum of the exterior diameter D11 of the protruded terminal 332 and two times a diameter direction distance D12 of the planar part 41 set on both sides of the diameter direction of the protruded terminal 332 (D1>D11+2×D12). That is, a first gap G1 exists between the outer surface of the protruded terminal 332 and the inner wall of the through hole 411 of the housing 40.

The first gap G1 prevents or substantially prevents the protruded terminal 332 from obstructing the area around the through hole 411 when the side part 42 of the housing 40 is coupled to the case 20 and the planar part 41 is in close contact with the cap plate 31.

In an embodiment, an insulating member 61 disposed in the outer circumference in the diameter direction of the thermal-fusion member 34 is installed on the inner surface of the cap plate 31. The insulating member 61 may form an electrically insulating structure between the cap plate 31 and the second electrode tab 52 and between the cap plate 31 and the electrode assembly 10. As an example, the insulating member 61 has a through hole 611 corresponding to the exterior diameter of the thermal-fusion member 34.

In an embodiment, in the housing 40, the diameter direction length D12 of the planar part 41 may be greater than or equal to a length H1 of the height direction of the side part 42 (D12≥H1). Therefore, the length H1 in the height direction creates a fastening force for the case 20 of the housing 40, and the length D12 in the diameter direction allows insulation performance of the terminal plate 33 to be sufficiently secured.

In an embodiment, referring to FIG. 1, in the rechargeable battery 1, the height H is set as the distance between the outer planes of the case 20 and the protruded terminal 332 in the state that the opening 21 of the case 20 is closed and sealed by the cap assembly 30, and the battery diameter D is set with the exterior circumference of the housing 40. In an embodiment, a ratio of the height H to the battery diameter D is 1 or less (H/D≤1). Therefore, the rechargeable battery 1 of the embodiment may be a coin-type battery or a button-type battery and may form a thin coin or button shape.

Herein, another embodiment of the present invention is described. By comparing the first and second embodiments, the description for the same configurations may be omitted, and different configurations are mainly described with respect to the second embodiment.

Figure 4:
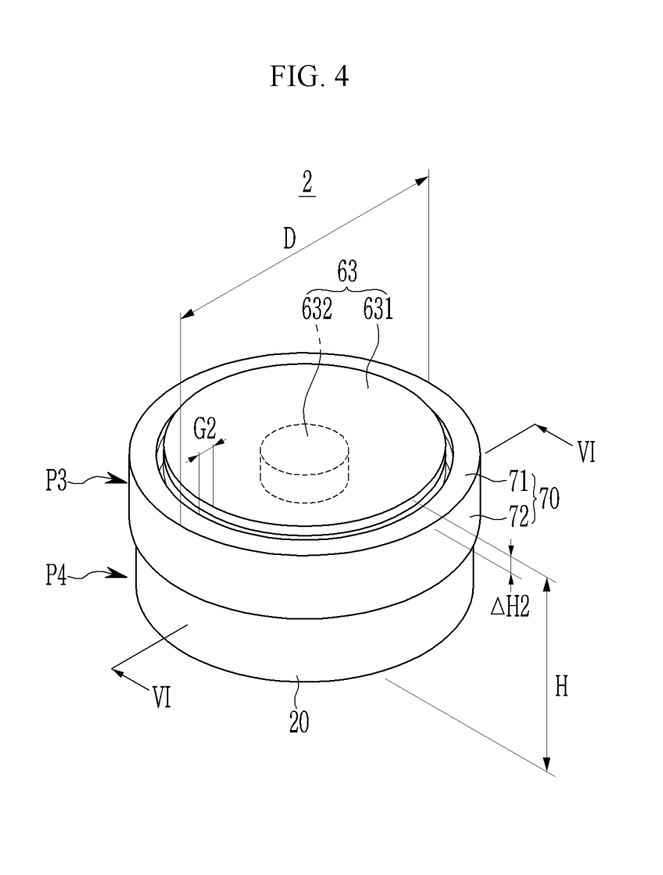
FIG. 4 is a perspective view of a rechargeable battery according to an embodiment of the present invention.
Figure 5:
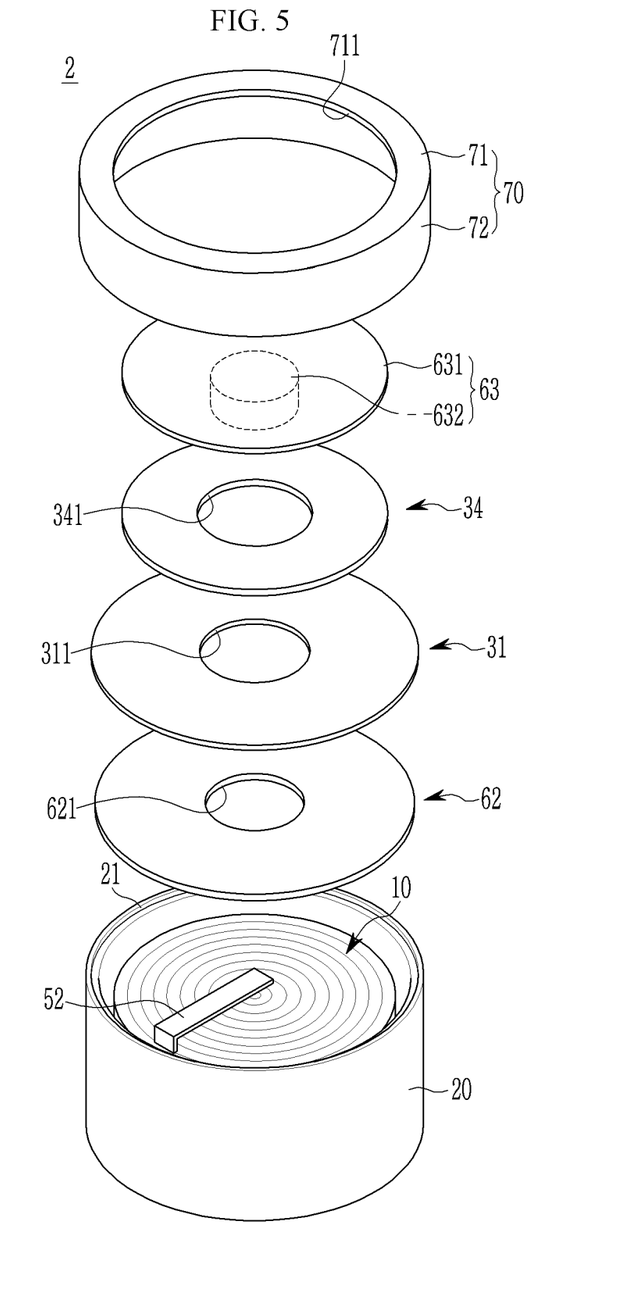
FIG. 5 is an exploded perspective view of the rechargeable battery of FIG. 4.

FIG. 4 is a perspective view of a rechargeable battery according to an embodiment of the present invention; FIG. 5 is an exploded perspective view of the rechargeable battery of FIG. 4; and FIG. 6 is a cross-sectional view taken along the line VI-VI of FIG. 4.

Figure 6:
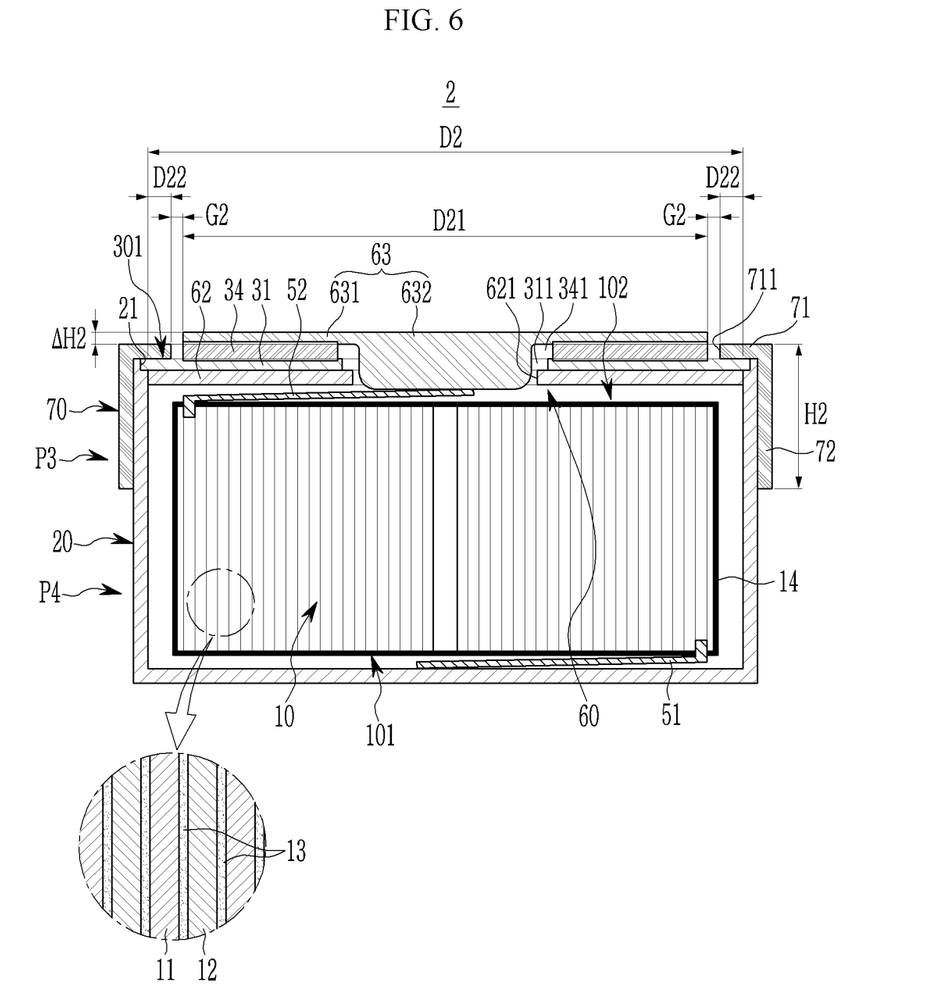
FIG. 6 is a cross-sectional view taken along the line VI-VI of FIG. 4.

Referring to FIG. 4 to FIG. 6, in a rechargeable battery 2 according to an embodiment, a terminal plate 63 of a cap assembly 60 includes a flange part 631 and a tab connection part 632. The flange part 631 is disposed on the outside of the cap plate 31 and is electrically insulated and attached to an outer surface of the cap plate 31.

A housing 70 is provided to prevent or substantially prevent a reverse direction insertion when assembling the rechargeable battery 2 into a set. As an example, the housing 70 covers the cap plate 31 and is coupled to the case 20 to form an extension part P3 in the rechargeable battery 2. On the cap plate 31, a part of the outer surface is covered with the flange part 631, and a flat surface (an exposed surface 301) of a remaining part of the outer surface is covered with the housing 70.

In the terminal plate 63, the tab connection part 632 is protruded from the center of the flange part 631 to the inside and penetrates the through hole 711 of the housing 70, the through hole 341 of the thermal-fusion member 34, and the terminal hole 311 of the cap plate 31 to be protruded toward the electrode assembly 10, and the second electrode tab 52 is electrically connected to the inner surface of the tab connection part 632.

The flange part 631 is protruded more with a second height difference ΔH2 than the outer surface of the housing 70 to form the outer surface. In other words, the outer surface of the flange part 631 is more protruded than the outer surface of the cap plate 31 with reference to the bottom of the case 20. Also, the outer surface of the flange part 631 and the outer surface of the housing 70 form planes spaced apart from each other in the diameter direction while having the second height difference ΔH2.

For example, the housing 70 includes a planar part 71 and a side part 72. The planar part 71 has a through hole 711 and is configured to cover the exposed surface 301 of the outer surface of the cap plate 31 while exposing the flange part 631 of the terminal plate 63. The side part 72 extends along the side of the case 20 at the outside of the planar part 71 to cover a part of the side of the case 20 and to be coupled to the side of case 20. In the rechargeable battery 2, a part where the housing 70 is combined with the case 20 forms the extension part P3, and a part without the housing 70 forms a non-extension part P4.

The housing 70 covers the exposed surface 301 of the cap plate 31 and is bonded to the case 20 to form the extension part P3. That is, the housing 70 forms a step on the side of the case 20 by the extension part P3. That is, the extension part P3 relatively increases the height or the diameter compared to the non-extension part P4.

In an embodiment, the through hole 711 of the housing 70 is concentric with the terminal hole 311 of the cap plate 31, and the interior diameter of the through hole 711 is formed larger than an exterior diameter D21 of the flange part 631. Therefore, an interior diameter D2 of the case 20 is larger than the sum of the exterior diameter D21 of the protruded terminal 631 and two times a diameter direction distance D22 of the planar part 71 set on both sides of the diameter direction of the flange part 631 (D2>D21+2×D22).

That is, a second gap G2 exists between the outer surface of the flange part 631 and the inner wall of the through hole 711 of the housing 70.

The insulating member 62 disposed in the diameter direction exterior circumference of the tab connection part 632 is installed on the inner surface of the cap plate 31. The insulating member 62 may form an electrically insulating structure between the cap plate 31 and the second electrode tab 52 and between the cap plate 31 and the electrode assembly 10. As an example, the insulating member 62 has a through hole 621 corresponding to the terminal hole 311 of the cap plate 31. The through hole 621 allows the second electrode tab 52 to be connected to the inner surface of the tab connection part 632. The through hole 621 is formed with a smaller diameter than the terminal hole 311, thereby preventing or substantially preventing the second electrode tab 52 from being in contact with the cap plate 31.

In the housing 70, the diameter direction length D22 of the planar part 71 may be less than or equal to a length H2 of the height direction of the side part 72 (D22 H2). Therefore, compared to the diameter direction length D12 of the first embodiment, the diameter direction length D22 is shorter, but the length H2 in the height direction allows for sufficiently securing the fastening force in the case 20 of the housing 70.

While the present invention has been described in connection with what are presently considered to be some practical embodiments, it is to be understood that the invention is not limited to the disclosed embodiments. On the contrary, it is intended to cover various modifications and equivalent arrangements included within the spirit and scope of the appended claims.

What is claimed is:

1. A button cell comprising:
a case receiving an electrode assembly and comprising an opening;
a cap assembly comprising a cap plate coupled to and electrically connected to the case and covering the opening, and a terminal plate coupled to the cap plate; and
a housing covering the cap plate and coupled to the case,
wherein the terminal plate protrudes through a terminal hole of the cap plate such that an outer surface of the terminal plate protrudes more than an outer surface of the housing to have a height difference, and
the cap plate and the terminal plate are thermally fused with a thermal-fusion member therebetween and are electrically insulated from each other, the thermal-fusion member being spaced outside the terminal hole of the cap plate so as not to overlap the terminal hole.

2. The button cell of claim 1, wherein
the electrode assembly comprises a first electrode, a second electrode, and a separator therebetween,
the case is connected to the first electrode by a first electrode tab, and
the terminal plate is connected to the second electrode by a second electrode tab.

3. The button cell of claim 2, wherein
the terminal plate comprises:
a flange part located between the cap plate and the electrode assembly and electrically insulated and attached to an inner surface of the cap plate; and
a protruded terminal protruded from a center of the flange part to the outside, penetrating the terminal hole of the cap plate and a through hole of the housing, and electrically connected to the second electrode tab by an inner surface of the terminal plate, and
the protruded terminal protrudes more than the outer surface of the housing by a first height difference to form an outer surface of the button cell.

4. The button cell of claim 3, wherein the housing comprises:
a planar part that covers an outer surface of the cap plate; and
a side part extending along a side of the case at an outside of the planar part to cover a part of the side of the case and be coupled to the side of the case.

5. The button cell of claim 4, wherein the housing is formed of an electrically insulating material.

6. The button cell of claim 5, wherein the through hole of the housing is concentric with the terminal hole of the cap plate, and an interior diameter of the through hole of the housing is larger than an exterior diameter of the protruded terminal.

7. The button cell of claim 4, wherein an interior diameter of the case is larger than a sum of an exterior diameter of the protruded terminal and two times a diameter direction distance of the planar part set on both sides in a diameter direction of the protruded terminal.

8. The button cell of claim 5, wherein the housing comprises PP, PE, PET, a PEN resin, or rubber.

9. The button cell of claim 2, wherein the terminal plate comprises:
   a flange part on an outer surface of the cap plate and electrically insulated and attached to the outer surface of the cap plate; and
   a tab connection part protruded from a center of the flange part to the inside and protruded toward the electrode assembly through a through hole of the housing and the terminal hole of the cap plate, and electrically connected to the second electrode tab by an inner surface of the terminal plate, and
   the flange part protrudes more than the outer surface of the housing by a second height difference to form an outer surface of the button cell.

10. The button cell of claim 9, wherein the housing comprises:
    a planar part comprising a through hole having a larger interior diameter than an exterior diameter of the flange part to cover an exposed surface of the cap plate while exposing the flange part; and
    a side part extending along a side of the case at an outside of the planar part to cover a part of the side of the case and to be joined to the side of the case.

11. The button cell of claim 10, wherein an interior diameter of the case is larger than a sum of an exterior diameter of the flange part and two times a diameter direction distance of the planar part set on both sides in a diameter direction of the flange part.

12. The button cell of claim 1, wherein the housing forms a step on a side of the case.

13. The button cell of claim 1, wherein
    the case sets a first diameter in a diameter direction at a lower part of the case, and
    the housing is coupled to an upper part of the case and sets a second diameter larger than the first diameter in the diameter direction.

* * * * *